United States Patent
Kobayashi

(10) Patent No.: US 7,633,532 B2
(45) Date of Patent: Dec. 15, 2009

(54) IMAGE PROCESSING METHOD, IMAGE PROCESSING APPARATUS, AND IMAGE PICKUP APPARATUS HAVING FIRST AND SECOND EXPOSURE VALUES

(75) Inventor: Hiroyuki Kobayashi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 442 days.

(21) Appl. No.: 11/598,688

(22) Filed: Nov. 14, 2006

(65) Prior Publication Data

US 2007/0120987 A1 May 31, 2007

(30) Foreign Application Priority Data

Nov. 15, 2005 (JP) ............... 2005-329929

(51) Int. Cl.
*H04N 9/73* (2006.01)
(52) U.S. Cl. .................. 348/223.1; 348/362
(58) Field of Classification Search ............. 348/229.1, 348/223.1, 362, 225.1, 228.1, 364, 366, 221.1
See application file for complete search history.

(56) References Cited

U.S. PATENT DOCUMENTS

2002/0167596 A1* 11/2002 Suzuki et al. ............ 348/223.1

FOREIGN PATENT DOCUMENTS

| EP | 599570 A1 * | 6/1994 |
|---|---|---|
| JP | 2002-290987 | 10/2002 |
| JP | 2004-173010 | 6/2004 |

* cited by examiner

*Primary Examiner*—Lin Ye
*Assistant Examiner*—Nelson D Hernández Hernández
(74) *Attorney, Agent, or Firm*—Young & Thompson

(57) ABSTRACT

An image processing method controls white balance of image data obtained by an image pickup apparatus according to image data of the image shot by the image pickup apparatus having pixels of a plurality of colors that includes shooting an image as a first exposure value by the image pickup apparatus, calculating a brightness of the first exposure value for each of divided regions according to image data by the first exposure value, shooting an image as a second exposure value by the image pickup apparatus, calculating a brightness for the second exposure value for each of the divided regions according to image data by the second exposure value, evaluating saturated brightness region among the divided regions according to the brightness for the first exposure value and the brightness for the second exposure value, and controlling white balance according to image data of non-saturated brightness region.

12 Claims, 9 Drawing Sheets

IMAGE PROCESSING METHOD, IMAGE PROCESSING APPARATUS, AND IMAGE PICKUP APPARATUS HAVING FIRST AND SECOND EXPOSURE VALUES

BACKGROUND OF THE INVENTION

1. Field of the Invention

The present invention relates to an image processing method, image processing apparatus, and an image pickup apparatus using thereof, and particularly to an image processing method, an image processing apparatus, and an image pickup apparatus using thereof for adjusting white balance based on image data obtained by an image pickup apparatus.

2. Description of Related Art

In a digital camera apparatus such as a CCD camera, normally white balance is adjusted according to a color temperature of light source. Thus even with a change in light source type, an image shot can be displayed with appropriate colors. Specifically, an image processing apparatus mounted to an image pickup apparatus sets different gains to R, G, and B depending on light source (for example daylight, cloudy, fluorescent, incandescent, and tungsten). This enables to represent appropriate white color in any light.

In such an adjustment of white balance, integrated values of R, G, and B are calculated for each divided region and the white balance is controlled according to R/G and B/G (as disclosed in Japanese Unexamined Patent Application Publication No. 2004-173010 and Japanese Unexamined Patent Application Publication No. 2002-290987).

An image processing apparatus disclosed in Japanese Unexamined Patent Application Publication No. 2004-173010 is described hereinafter in detail. The image processing apparatus firstly divides an input image into regions of m×n. Then R, G, and B are integrated to each of the region divided into m×n so as to calculate R/G and B/G. After that R/G and B/G calculated for each region divided into m×n is evaluated which light source type range they fall in on a light source estimated map as with the one shown in FIG. 4.

Then an Exposure Value (hereinafter referred to as an EV) at a time of shooting is read out. After that an evaluation value is calculated based on a membership function that defines a trend value with the EV read out as a variable. The evaluation value is calculated for each light source type. In case the evaluation value is more than or equal to a specified value, the white balance is adjusted with the light source type having a maximum evaluation value. However in this image processing, an evaluation of light source could be incorrect in case there is a subject with saturated brightness in a part of the divided region. That is, for a region having a brightness larger than maximum gradient, R/G and B/G cannot correctly be calculated. Thus, light source cannot be accurately evaluated.

An image processing apparatus disclosed in Japanese Unexamined Patent Application Publication No. 2002-290987 includes a dedicated circuit for detecting saturated brightness. Thus, white balance can be more stably controlled. It has now been discovered that with this image processing apparatus, a size of the circuit increases due to the dedicated circuit. The size of the circuit is desirably small especially for a LSI for mobile devices in terms of power saving. Accordingly it is preferable to prevent mounting unnecessary circuit as much as possible. It has now been discovered that in a conventional image processing apparatus, it is difficult to adjust white balance appropriately without increasing the circuit size. The present invention is developed in light of the abovementioned problem. The present invention is purposed to provide an image processing method, an image processing apparatus, and an image pickup apparatus for easily and appropriately adjusting white balance.

SUMMARY OF THE INVENTION

According to an aspect of the present invention, there is provided an image processing method for controlling white balance of image data obtained by an image pickup apparatus according to image data of the image shot by the image pickup apparatus having pixels of a plurality of colors. The image processing method includes shooting an image as a first exposure value by the image pickup apparatus, calculating a brightness of the first exposure value for each of divided regions that the image pickup apparatus shot and divided an image into a plurality of regions according to image data by the first exposure value, shooting an image as a second exposure value different from the first exposure value by the image pickup apparatus, calculating a brightness for the second exposure value for each of the divided regions according to image data by the second exposure value, evaluating saturated brightness region that brightness is saturated among the divided regions according to the brightness for the first exposure value and the brightness for the second exposure value, and controlling white balance according to image data of non-saturated brightness region excluding the saturated brightness region among the divided regions. This enables to evaluate the saturated brightness region and non-saturated brightness easily. Thus a white balance setting can be changed according to the image data of the non-saturated brightness region. Accordingly a shooting image can be displayed with an appropriate white balance.

According to another aspect of the present invention, there is provided an image processing apparatus for controlling white balance of image data obtained by an image pickup apparatus according to image data of the image shot by the image pickup apparatus having pixels of a plurality of colors. The image processing apparatus includes an image data storing unit for storing the image data of the image shot by the image pickup apparatus, a integrated value calculator for calculating integrated value of each color for each of divided regions that the image is divided into a plurality of regions according to the image data, a brightness calculator for calculating a brightness for each of the divided regions according to the integrated value calculated by the integrated value calculator, a saturated brightness region evaluation unit for evaluating a saturated brightness region that brightness is saturated among the divided regions according to a brightness for a first exposure value calculated by the brightness calculator in case of shooting as a first exposure value and a brightness for a second exposure value calculated by the brightness calculator in case of shooting as a second exposure value, and a white balance controlling unit for controlling white balance according to image data of non-saturated brightness region excluding the saturated brightness region among the divided regions. This enables to evaluate the saturated brightness region and non-saturated brightness easily. Thus a white balance setting can be changed according to the image data of the non-saturated brightness region. Accordingly a shooting image can be displayed with an appropriate white balance.

The present invention provides an image processing method, an image processing apparatus, and an image pickup apparatus for easily appropriately adjusting white balance.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
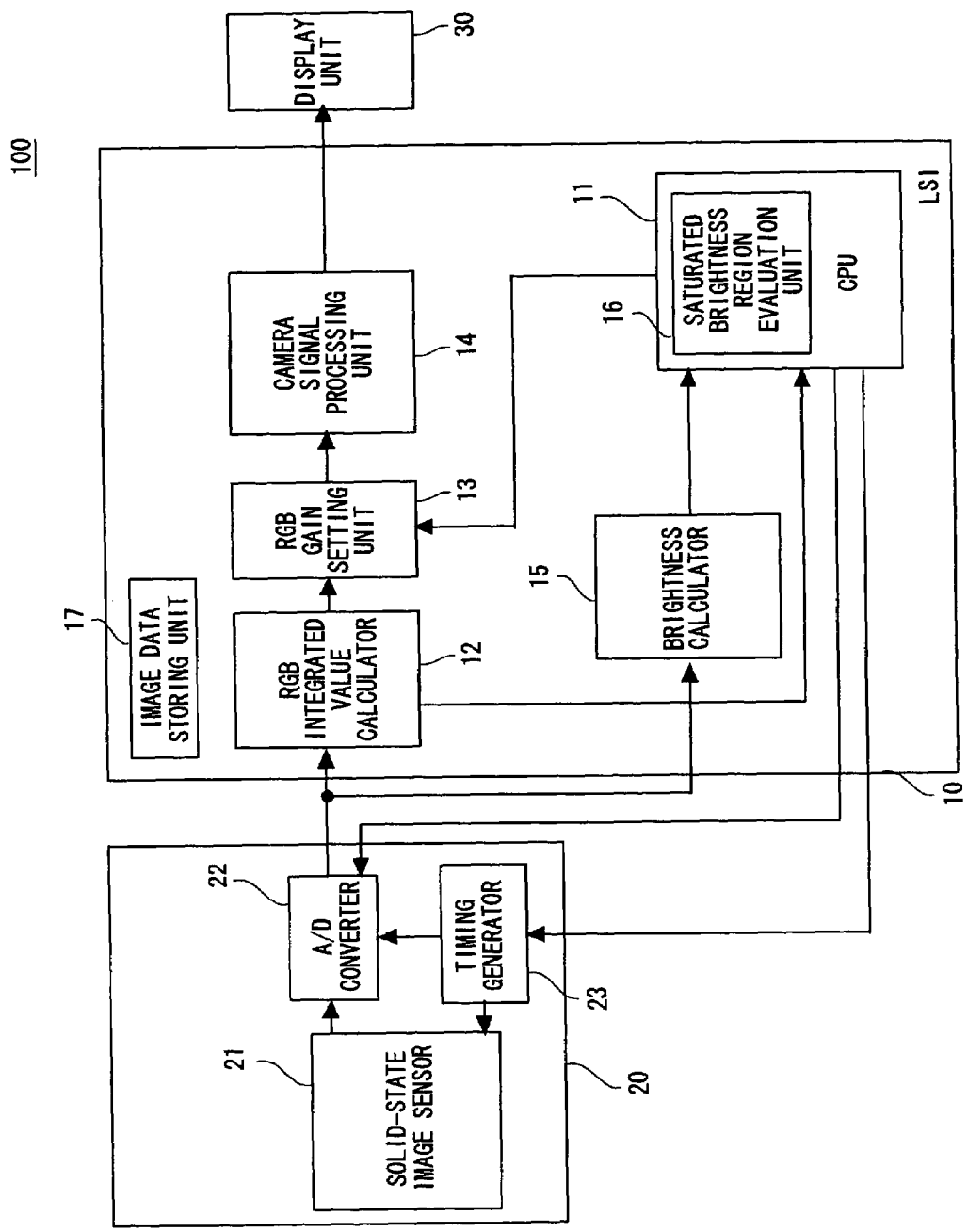
FIG. 1 is a block diagram showing an image pickup apparatus according to the present invention.

An image pickup apparatus of the present invention is described hereinafter in detail with reference to FIG. 1. FIG. 1 is a block diagram showing a configuration of an image pickup apparatus 100 of the present invention. The image pickup apparatus 100 is for example a digital camera apparatus such as a CCD or CMOS camera. The image pickup apparatus 100 includes an image processing apparatus 10, a camera unit 20, and a display unit 30. An image shot by the camera unit 20 is processed as appropriate by the image processing apparatus 10. Then the display unit 30 displays the image processed by the image processing apparatus 10. In this example, a still image is assumed to be shot by the image pickup apparatus 100. Further in this embodiment, a configuration for controlling white balance in shooting a still image is explained.

In the camera unit 20, 21 is a solid-state image sensor, 22 is an A/D converter, and 23 is a timing generator (hereinafter referred to as a TG). Light receiving devices such as photodiodes are arranged in array in the solid-state image sensor 21. Further, each of the light receiving devices of the solid-state image sensor 21 is provided with color filters of R(Red), G (Green), and B (Blue). The color filters for R, G, and B are pervious to light having a specified wavelength band. Therefore, arranging R, G, and B color filters over a light receiving surface enables to shoot a full color image. In case the solid-state image sensor 21 is a CCD (Charged Coupled Device) for example, charges generated by the light receiving devices are sequentially transferred by charge coupled devices. Then a detection signal corresponding to an amount of light received for each pixel is output to the A/D converter 22. The A/D converter 22 includes an amplifier and an A/D converter. The A/D converter 22 amplifies the detection signal from the solid-state image sensor 21 and converts it to a digital signal. The detection signal corresponding to the amount of light received for each pixel is converted to digital data in this way. The detection signal converted into a digital signal is output to the image processing apparatus 10. The TG 23 outputs a timing signal to the solid-state image sensor 21 and the A/D converter 22. This controls a shooting timing and exposure time in the solid-state image sensor and a signal process by the A/D converter 22.

The image processing apparatus 10 is for example a LSI. The image processing apparatus 10 includes a CPU (Central Processing Unit) 11, a RGB integrated value calculator 12, a RGB gain setting unit 13, a camera signal processing unit 14, a brightness calculator 15, and an image data storing unit 17. A saturated brightness region evaluation unit 16 is provided in the CPU 11. The CPU 11 outputs a control signal for controlling the A/D converter 22 and the TG 23 in the camera unit 20. The A/D converter 22 amplifies the detection signal at a specified amplification factor and outputs the detection signal for each pixel to the image processing apparatus 10. The TG 23 outputs the timing signal such as a synchronizing signal according to the control signal of the CPU 11. The CPU 11 controls processes in the RGB integrated value calculator 12, the RGB gain setting unit 13, the camera signal processing unit 14, the brightness calculator 15, the saturated brightness region evaluation unit 16, and the image data storing unit 17. For example the CPU 11 calculates a gain for the RGB gain setting unit 13 according to an evaluation result of the saturated brightness region evaluation unit 16 and a calculation result of the RGB integrated value calculator 12 so as to adjust white balance. Then the CPU 11 sets the gain to the RGB gain setting unit 13.

The RGB integrated value calculator 12 calculates integrated values of R, G, and B for each of the divided region according to the detection signals from the A/D converter 22. For example the image shot is divided into m×n (wherein m and n are natural numbers) to define the divided regions. After that, integrated values of each of R, G, and B for each of the divided region are calculated. To be more specific, the integrated value of R is calculated by adding all digital data of R pixels. The integrated values of G and B are calculated in the same way. This process is performed for all the divided regions. The integrated values of each of R, G, and B are calculated for each of the divided region in this manner. The integrated values of each of R, G, and B calculated for each of the divided region are stored to the RGB integrated value calculator 12.

Data for R, G, and B pixels are input from the RGB integrated value calculator 12 or the A/D converter 22 to the RGB gain setting unit 13. The data input to the RGB gain setting unit 13 is data before integrate, that is, the data for each pixel. Further, the gains of R, G, and B are set to the RGB gain setting unit 13. That is, the RGB gain setting unit 13 stores the gains of R, G, and B. The RGB gain setting unit 13 processes the data for R, G, and B according to the gains being set. For example in case the gain of R is 1.2, data of all R pixels are integrated by 1.2. Needless to say that the gains of R, G, and B may be the same or different values. White balance can be controlled by adjusting the gains. To be more specific, the white balance is controlled by the CPU 11 changing the gains. The CPU 11 updates the white balance setting every time shooting button is pressed. The control method is described later in detail. The gain setting unit 13 outputs the processed data of R, G, and B to the camera signal processing unit 14.

The camera signal processing unit 14 generates images for displaying and storing according to the data of R, G, and B that is processed in the RGB gain setting unit 13. That is, processes such as color interpolation, gamma correction, and sharpness correction are performed to create data for displaying and storing. Since the camera signal processing unit 14 is input with data that the white balance is adjusted by the RGB gain setting unit 13, an appropriate image can be displayed. Further, the data processed by the RGB gain setting unit 13 or the camera signal processing unit 14 is stored to the image data storing unit 17. The image data storing unit 17 includes a storage such as a nonvolatile or volatile memory. Thus an image shot by the camera unit 20 can be stored. Further an image stored to the image data storing unit 17 has its white balance adjusted. Accordingly an appropriate image can be stored. The display unit 30 displays based on the data processed by the camera signal processing unit 14.

The brightness calculator 15 calculates brightness for each of the divided region according to the detection signals from the A/D converter 22. The brightness can be calculated according to the data of G pixels which has high visibility. In this case, an average of G pixel data in each divided region can be a brightness. For example by dividing the integrated value of G calculated by the RGB integrated value calculator 12 by the number of G pixels included in one of the divided regions, an average brightness for the divided region can be calculated. The brightness calculator 15 calculates brightness for a first image shot as an appropriate exposure value and for a second image shot with an exposure value having 1/p of the appropriate exposure value. That is, the brightness for a first exposure value can be calculated along with the image data of the first image and the brightness for a second exposure value according to the image data of the second image. The exposure values can be adjusted by adjusting exposure time or an aperture of the camera unit 20. Otherwise the exposure values can be adjusted by adjusting an amplification factor of the amplifier mounted to the A/D converter 22. The exposure values may be adjusting in combination of more than one abovementioned methods. Changing the exposure values enables to shoot with different exposure. In this example, an image shot with the first exposure value is assumed to be an appropriate exposure image, and an image shot with the second exposure value is assumed to be an exposure image for determining saturated brightness region.

The saturated brightness region evaluation unit 16 evaluates whether the divided region is a saturated brightness region based on the brightnesses for the first exposure value and the second exposure value. That is, a divided region where the brightness for the second exposure value is larger than 1/p of the brightness for the first exposure value is evaluated to be a saturated brightness region. Shooting with the first exposure value causes to saturate in a part of an image being shot. Thus pixels that receive light with an amount of light larger than a amount of light corresponding to a maximum gradient exist. With these pixels, image data when shooting with the second exposure value is not 1/p of the image data for the first exposure value. This enables to evaluate whether the brightness is saturated or not. For the exposure value for evaluating saturated brightness region, ½ to ¹⁄₁₆ of the appropriate exposure value can be set, for example. Having the exposure value for evaluating saturated brightness region larger than ¹⁄₁₆ of the appropriate exposure value enables to reduce influence of noise in the solid-state image sensor 21 etc. Further, having the exposure value for evaluating saturated brightness region smaller than ½ of the appropriate exposure value enables to accurately evaluate non-saturated brightness region. The exposure value for evaluating saturated brightness is preferably ¼ to ⅛ of the appropriate exposure value. As described in the foregoing, the CPU 11 is able to evaluate a saturated brightness region, thereby simplifying a circuit configuration.

Figure 2A:
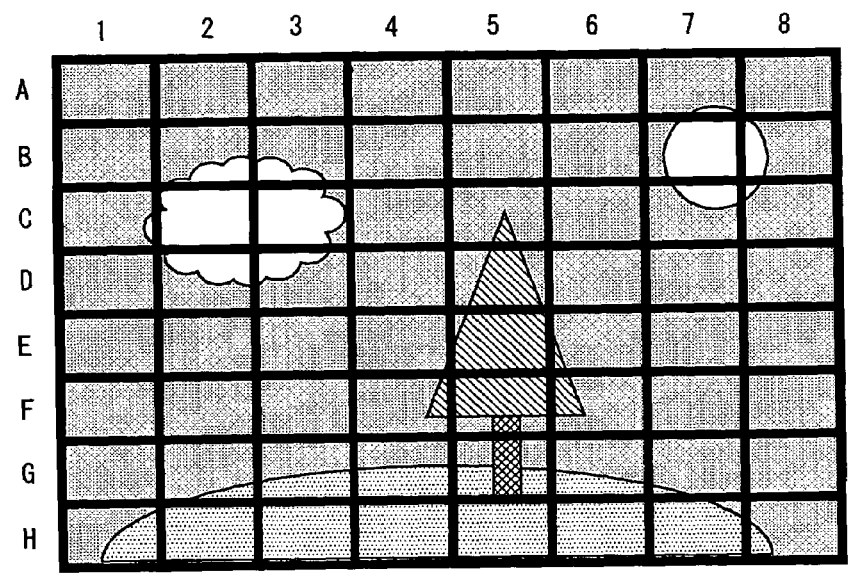
FIGS. 2A and 2B are schematic views showing an image shot by an image pickup apparatus according to the present invention.
Figure 2B:
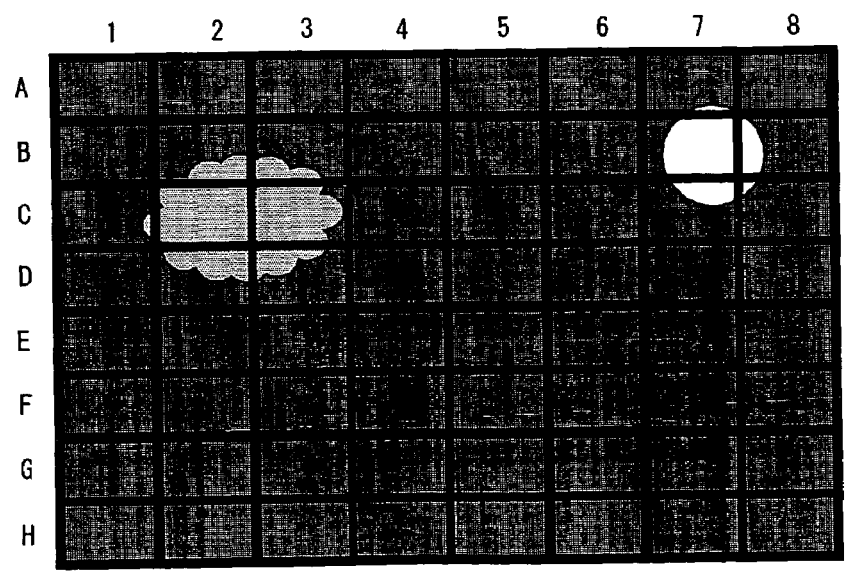
Figure 3:
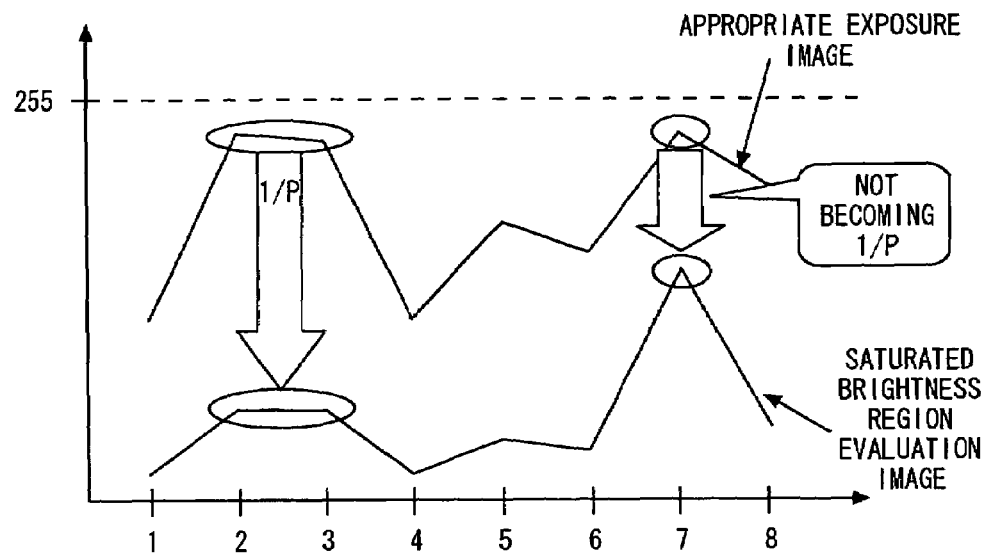
FIG. 3 is a graph chart showing an average brightness of the image of FIGS. 2A and 2B.

A process of evaluating a saturation of brightness is described hereinafter in detail with reference to FIGS. 2A, 2B and 3. FIG. 2A is a view showing an image shot with the appropriate exposure value. FIG. 2B is a view showing an image shot with 1/p of the exposure value of FIG. 2A. That is, FIG. 2A is an appropriate exposure image, and FIG. 2B is an exposure image for evaluating saturated brightness region. FIG. 3 is a view showing an average brightness of the images of FIGS. 2A and 2B. In this example, FIGS. 2A and 2B are images shooting the same scene with different exposure values. In FIGS. 2A and 2B, image data is divided into divided regions of 8×8. Accordingly the images shot are divided into 64 divided regions. As shown in FIGS. 2A and 2B, the divided regions are identified with A to H in vertical direction, and 1 to 8 in horizontal direction. For example the divided region on top left is the divided region A1. The divided region on bottom right is the divided region H8. In this example, the divided regions A1 to H8 are divided in the same size. Accordingly pixels of the same number are included in each divided region.

FIGS. 2A and 2B are images shooting an outdoor scene. Images of FIGS. 2A and 2B are shooting the same shooting region and the condition but with different exposure values. In case of shooting with normal exposure value, a light source (sun) is shot near the divided region B7 as shown in FIG. 2A. Accordingly brightness is saturated near and in the divided region B7. Specifically, pixels with saturated brightness exist in the divided regions A7, B7, B8, and C8. Further, a cloud is shot near the divided region C2. Thus the brightness is high near and in the divided region C2. Specifically, pixels having brightness close to the maximum gradient exist in the divided regions B2, B3, C1, C2, C3, D2, and D3. In these regions, the brightness is not saturated because a amount of light is not high as the light source.

In case of shooting with 1/p exposure value, the brightness is not saturated in all the divided regions. Specifically, since the exposure value is low, pixels do not receive light with its amount not enough to saturate. However as shown in FIG. 2B, pixels corresponding to sun and clouds have the brightness higher than other parts. In other words, pixels having higher brightness exist in the divided regions A7, B7, B8, C7, and C8. Further, pixels having slightly high exist in the divided regions B2, B3, C1, C2, C3, D2, and D3.

The brightness of the exposure image for evaluating saturated brightness region becomes smaller than the brightness for the appropriate exposure image as shown in FIG. 3. FIG. 3 is a view showing brightness of the divided region of the second row (row B). The brightness for the exposure image for evaluating saturated brightness region becomes 1/p of the brightness of the appropriate exposure image excluding the saturated divided regions. That is, for the saturated divided regions, the brightness for the exposure image for evaluating saturated brightness region becomes larger 1/p of the brightness of the appropriate exposure image. For example, since the divided regions B2 and B3 do not include pixels with saturated brightness, the brightness of the appropriate exposure image is high but the brightness for the exposure image for evaluating saturated brightness region becomes 1/p. On the other hand, in the divided region B7 including pixels with saturated brightness, the brightness for exposure image for evaluating saturated brightness region becomes larger than 1/p.

For example in case the exposure value of the exposure image for evaluating saturated brightness region is ¼ of that of the appropriate exposure image, and the brightness for the appropriate exposure image is 100, the brightness for the exposure image for evaluating saturated brightness region is 25. Accordingly in the divided region not including pixels with saturated brightness, in case an average brightness for the appropriate exposure image is 100, an average brightness of the exposure image for evaluating saturated brightness region is 25. On the other hand for pixels with saturated brightness, the amount of receiving light does not become ¼ even with the exposure value is reduced to ¼. Specifically, with the pixels with saturated brightness, brightness for the appropriate exposure image is 255, however the brightness for the exposure image for evaluating saturated brightness region becomes larger than 63.75 (=255÷4). Thus an average brightness in the divided region including saturated pixels will not be ¼. Accordingly, by shooting two images with different exposure values and comparing brightness for the two images, it is possible to easily evaluate whether the region is saturated or not. In other words, by obtaining two images with different exposure values and comparing average brightness of the two images for each divided region, two divided region can be evaluated whether it includes pixels with saturated brightness. The saturated brightness region evaluation unit 16 evaluates whether the brightness is saturated for all the divided regions in this manner.

The CPU 11 adjusts the white balance according to the integrated values of R, G, and B for the divided regions where the brightness is not saturated (non-saturated brightness region) based on an evaluation result by the saturated brightness region evaluation unit 16. For example in the example shown in FIGS. 2A and 2B, the white balance is adjusted without considering the divided regions A7, B7, B8, and C8 where the brightness is saturated. That is, the white balance is adjusting excluding the image data in the saturated brightness regions. This enables to display a shooting image with an appropriate white balance. The CPU 11 is a white balance adjusting unit for adjusting the white balance according to the R, G, and B integrated values for the non-saturated brightness regions. An example of the process for adjusting the white balance is described hereinafter with reference to FIG. 4.

The CPU 11 calculates R/G and B/G for each non-saturated brightness region according to the R, G, B integrated values calculated by the RGB integrated value calculator 12. In this example, R/G indicates (the integrated value of R)/(the integrated value of G). B/G indicates (the integrated value of B)/(the integrated value of G). Then values of R/G and B/G are plotted to a light source estimated map shown FIG. 4. In the light source estimated map, ranges for R/G and B/G corresponding to each light source (light source type range) are specified. For example R/G=0.6 and B/G=1.6 a plotted point is included in the light source range of clear sky. Thus a shooting light source is estimated to be clear sky. Then values for all the divided regions (non-saturated brightness region) excluding divided regions with saturated brightness (saturated region) are plotted. An evaluation value F is calculated for each light source type according to the number of plotted points. The evaluation value F is the number of points included in the light source type range shown in FIG. 4. For example in case values for 10 R/G and B/G among the 64 divided regions are included in clear sky light source type range, the evaluation value F of clear sky is 10. Needless to say that the evaluation value F may be calculated using the membership function as disclosed in Japanese Unexamined Patent Application Publication No. 2004-173010. Furthermore, the evaluation value F can be calculated by other methods.

The CPU 11 controls white balance according to the calculated evaluation value F. Specifically, the CPU 11 sets the gains of R, G, and B of the RGB gain setting unit 13 to preferred values. For example a light source type having the largest evaluation value F is determined to be the shooting light source. Further, the gains of R, G, and B are previously stored for each light source type in the image processing apparatus 10. Accordingly the gains corresponding to the light source having the largest number of points in its range are set to the RGB gain setting unit 13. The gain setting unit 13 processes image data according to the gain. This enables to control the white balance with a simple configuration. It therefore prevents from increasing circuit size and also enables to reduce power consumption. As described in the foregoing, two images are shot with different exposure values and brightness for the two images are compared. Saturated regions where its brightness is saturated are determined among the divided regions based on the comparison result. Then the white balance is adjusted according to the integrated values of R, G, and B in non-saturated brightness regions. The white balance can be accurately adjusted in this way.

Figure 5:
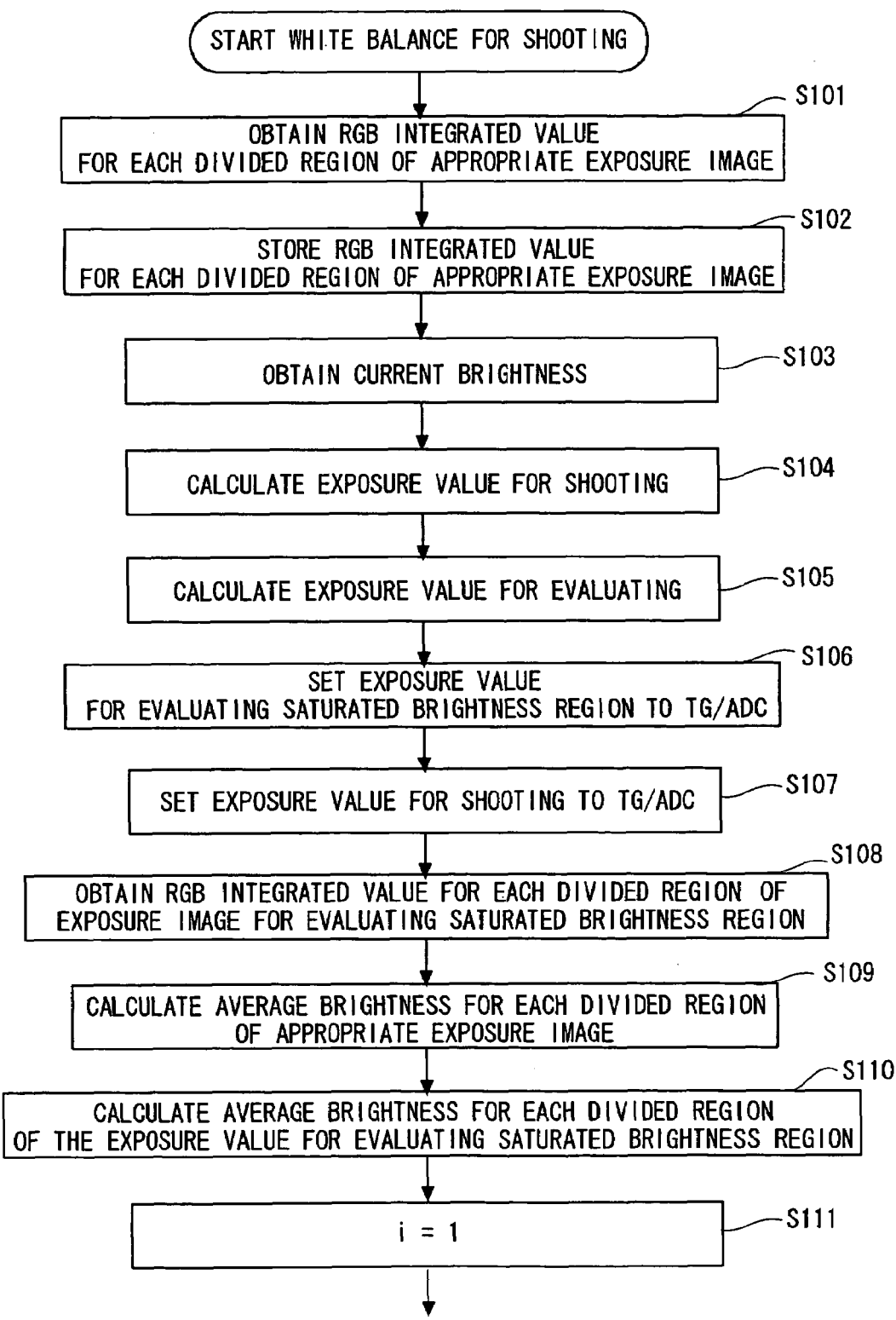
FIG. 5 is a part of a flow chart showing the image processing method according to a first embodiment of the present invention.
Figure 6:
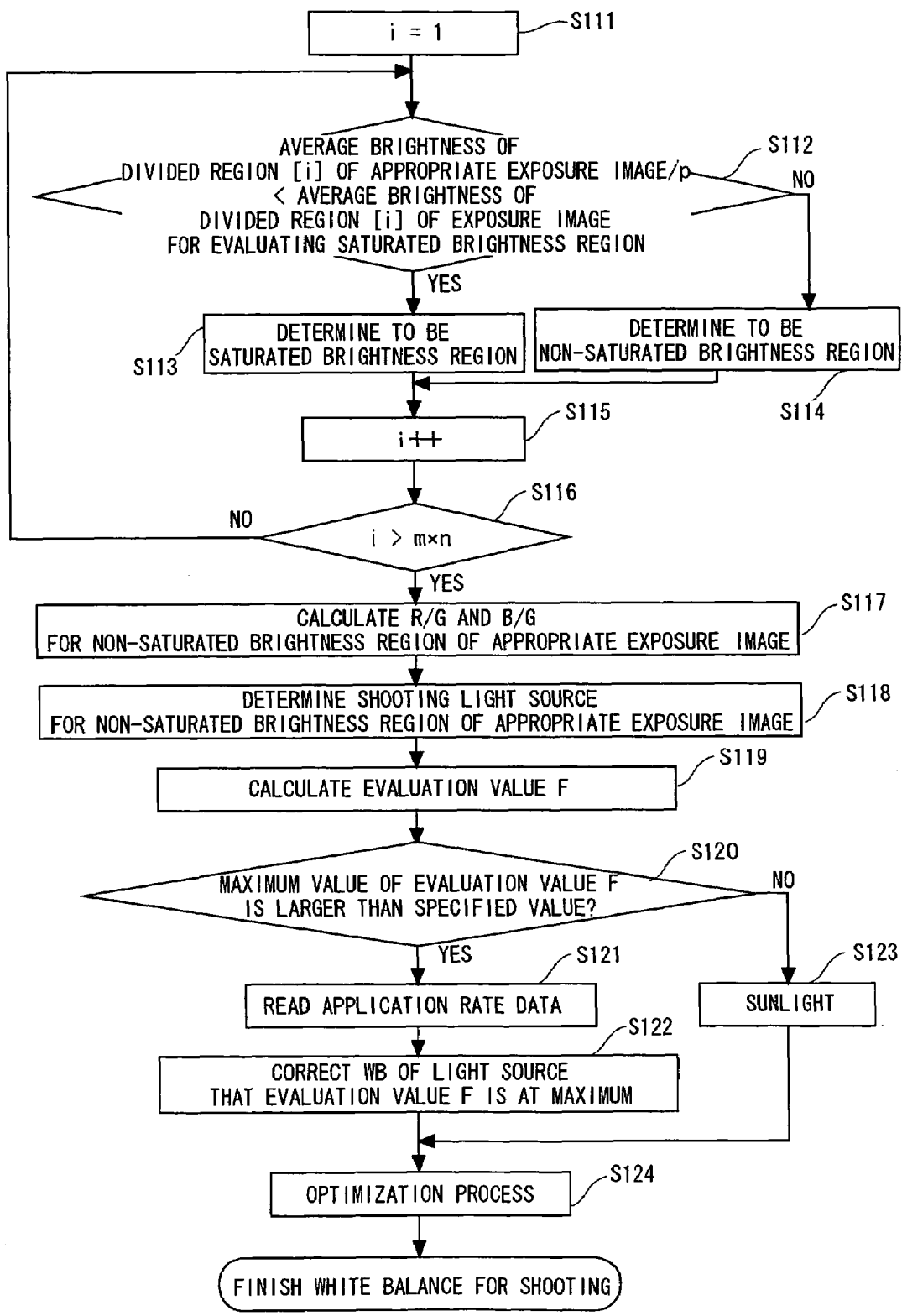
FIG. 6 is a part of a flow chart showing the image processing method according to the first embodiment of the present invention.

An image processing method for controlling white balance is described hereinafter in detail with reference to FIGS. 5 and 6. FIGS. 5 and 6 are flow chart showing the image processing method for controlling white balance. FIG. 6 is a subsequent flow chart following the flow chart of FIG. 5.

In this embodiment, white balance for shooting is started to be controlled when a photographer presses a shooting button. To be more specific, when the photographer presses a shooting button, the RGB integrated value for each divided region of an appropriate exposure image is calculated with an image obtained when the photographer presses the shooting button (step S101). In this example, data of R, G, and B are added for each divided region. Then the RGB integrated value being obtained is stored (step S102). The RGB integrated value calculator 12 obtains and stores the RGB integrated value. Then a current brightness is obtained (step S103). In this example the current brightness can be calculated according to image data obtained before pressing the shooting button.

After that, an exposure value for shooting to actually shoot an image is calculated based on the current brightness obtained in the step S103 (step S104). That is, in case a brightness of an image shot with an appropriate exposure value is high, the exposure value for shooting is reduced. On the other hand, in case a brightness of an image shot with the appropriate exposure value is low, the exposure value for shooting is increased. The exposure value for shooting after adjusting white balance can be calculated in this way. Therefore, the image shot with the exposure value for shooting has its white balance adjusted appropriately Needless to say that in case the exposure value for the appropriate exposure image is the same as the exposure value for shooting, the exposure value for shooting needs not to be calculated. Then the exposure value for evaluating saturated brightness region is calculated (step S105). In this example, the CPU 11 calculates the exposure value for evaluating saturated brightness region as 1/p of the exposure value of the appropriate exposure image.

After that, the exposure value for evaluating saturated brightness region is set to the TG 23 and the A/D converter 22 (step S106). This enables to shoot with the exposure value for evaluating saturated brightness region. Specifically, an exposure time specified by the TG 23 and an amplification factor in the amplifier of the A/D converter 22 are controlled. That is, the CPU 11 adjusts the exposure time and amplification factor in order to shoot with the exposure value for evaluating saturated brightness region. For example the appropriate exposure value can be changed to the exposure value for evaluating saturated brightness region by changing the exposure time to 1/p or the amplification factor to 1/p. Needless to say that the exposure value can be changed by changing aperture of the camera unit 20. The exposure value can be changed in a combination of these methods.

Further, the exposure value for shooting is set to the TG 23 and the A/D converter 22 (step S107). Setting the exposure value for shooting is performed in the same manner as the exposure value for evaluating saturated brightness region. Then an image is shot with the exposure for evaluating saturated brightness region and RGB integrated value for each divided region of the exposure image for evaluating saturated brightness region is obtained (step S108). Integrated values for R, G, and B with the exposure value for evaluating saturated brightness region can be obtained.

After that, an average brightness for each divided region of the appropriate exposure image is calculated (step S109). Further, an average brightness for each divided region of the exposure image for evaluating saturated brightness region is calculated (step S110). In this example, the brightness calculator 15 calculates the average brightnesses of the appropriate exposure image and the exposure image for evaluating saturated brightness region. The average brightness is calculated for each of the divided region. For example in case divided regions of m×n exist, average brightness of m×n are calculated for each of the appropriate exposure image and the exposure image for evaluating saturated brightness region. The average brightness of the divided regions is calculated for the appropriate exposure image and the exposure image for evaluating saturated brightness region in this manner.

After that, each divided region is evaluated whether the brightness is saturated or not (step S111 to S116). Specifically, the average brightness in a first divided region is compared with i=1 (step S111). That is, in the first divided region, (the average brightness of the appropriate exposure image)/p is compared with the average brightness of the exposure image for evaluating saturated brightness region. In case (the average brightness of the appropriate exposure image)/p is smaller than the average brightness of the exposure image for evaluating saturated brightness region, the first divided region is evaluated to be a saturated brightness region (step S113). On the other hand in case (the average brightness of the appropriate exposure image)/p is larger than or equal the average brightness of the exposure image for evaluating saturated brightness region, the first divided region is evaluated to be a non-saturated brightness region (step S114). After that, i is incremented (step S115). Then i is evaluated whether it is smaller than m×n (step S116). In case i<m×n or i=m×n, the steps from S112 are repeated. This evaluates the second divided region. The steps from 112 to 115 are repeated until achieving i>m×n.

When achieving i>m×n, R/G and B/G are calculated for the non-saturated brightness region of the appropriate exposure image (step S117). Then shooting light source for the non-saturated brightness region of the appropriate exposure image is evaluated (step S118). For example the shooting light source can be evaluated according to the light source estimated map shown in FIG. 4. After completing to evaluate the shooting light source for all the non-saturated regions, an evaluation value F is calculated (step S119). The evaluation value F is calculated according to the number of divided regions included in a light source type range of the light source estimated map shown in FIG. 4. Further, the evaluation value F can be given with weight by the membership function.

Figure 4:
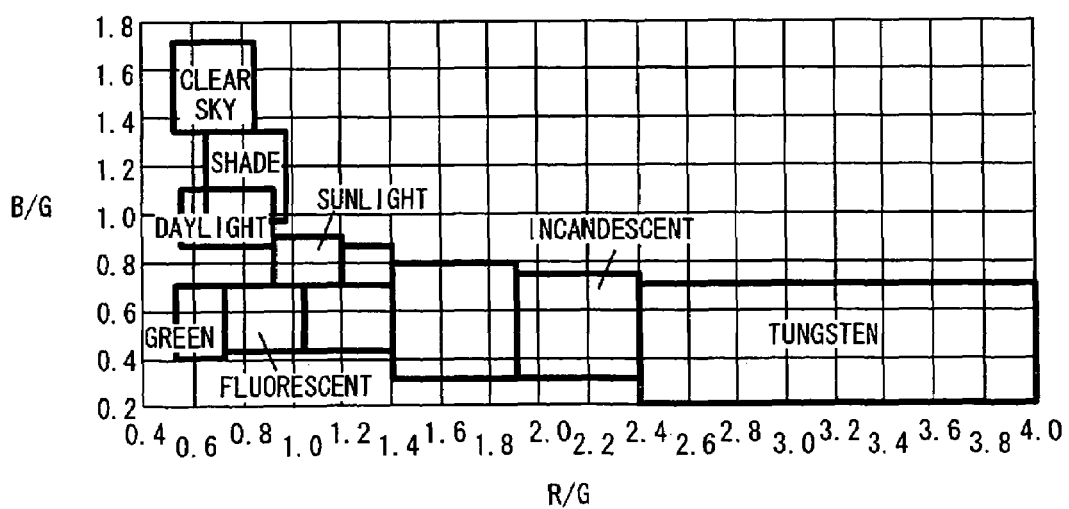
FIG. 4 is a view showing an example of a light source estimated map used in an image processing method according to the present invention.

Then a maximum evaluation value F among the evaluation values F calculated for each light source type is evaluated whether it is larger than a specified value (step S120). For example the images shown in FIGS. 2A and 2B are shot in clear sky. Thus the evaluation value F to be a maximum value is the evaluation value F of the clear sky light source type. That is, the number of points included in clear sky light source type range in the light source estimated map of FIG. 4 is larger than the points in other light source type ranges. Needless to say that the light source type having a maximum evaluation value F is selected among clear sky, shade, daylight, sunlight, green, fluorescent, incandescent, and tungsten. Then the maximum value of the evaluation value F is evaluated whether it is larger than a specified value. If the maximum value of the evaluation value F is evaluated to be larger than the specified value, application rate data of the light source type corresponding to the evaluation value F is read out (step S121). For example in case the light source that the evaluation value F becomes maximum is incandescent, the application rate data corresponding to incandescent is read out from a memory and the like. The application rate data includes the gain set by the RGB gain setting unit 13, for example. Then the white balance is corrected for the light source having a maximum evaluation value F (step S122). In other words, in case the maximum evaluation value F is larger than a specified value, gains of R, G, and B of the RGB gain setting unit 13.

In the step S120, in case the maximum evaluation value F is smaller than the specified value, the light source type is set as sunlight (step S123). In this case, the same process as the case in which the light source type is sunlight is executed. As described in the foregoing, white balance is corrected by setting gains of RGB in steps S122 and S123. Then perform an optimization (step S124) so as to complete an adjustment of the white balance for shooting. In the optimization, gamma is corrected and sharpness is specified. After adjusting the white balance in this manner, an image is shot with the exposure value for shooting and the image data is stored to the image data storing unit 17. The image data stored to the image data storing unit 17 has its white balance adjusted appropriately. The white balance can be easily and appropriately adjusted by these image processing.

The gain setting is changed at a timing of obtaining the image for shooting, the white balance can be appropriately adjusted. In the explanation above, the exposure image for evaluating saturated brightness region is obtained after obtaining the appropriate exposure image. However the order of obtaining the images is not limited to this. For example the appropriate exposure image may be obtained after obtaining the exposure image for evaluating saturated brightness region.

Figure 7:
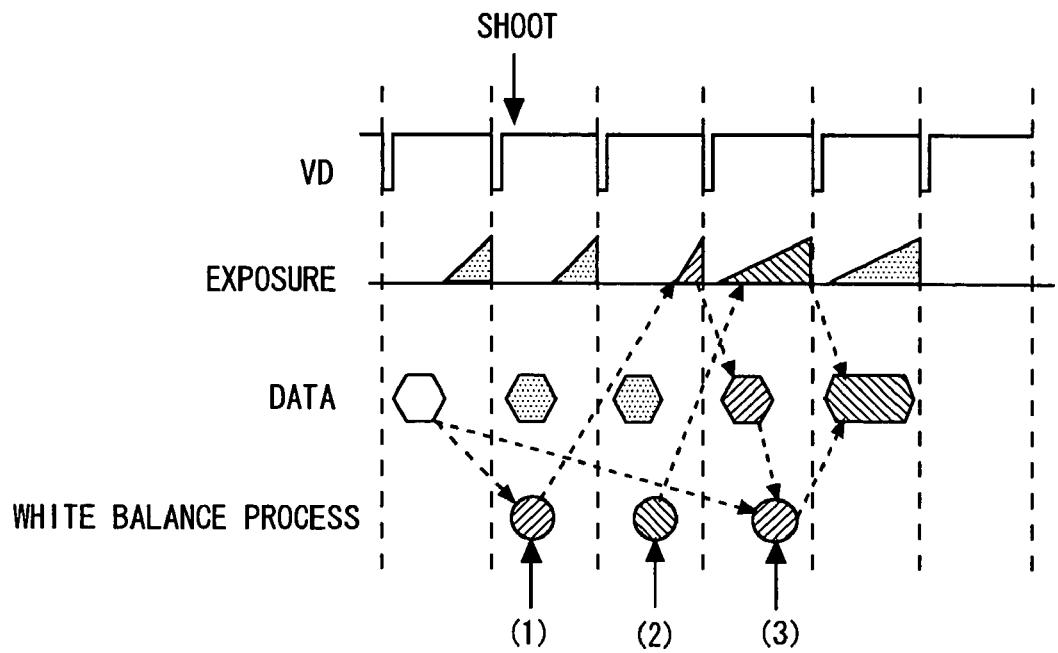
FIG. 7 is a timing chart showing the image processing method according to the first embodiment of the present invention.

A preferred timing for the abovementioned image processing is described hereinafter in detail with reference to FIG. 7. FIG. 7 is a timing chart showing a process of controlling white balance when shooting an image. In this example, an operation of shooting by pressing a shooting button in a live view mode is described. The mode is already set to the live view mode before pressing the shooting button, and an image displayed on the display unit 30 is updated at a constant interval. Pressing the shooting button causes to change the setting of the white balance based on an image at the timing. After that, an the image is shot with the setting and image data is stored to the image data storing unit 17.

A synchronizing signal VD from the TG 23 is input to the solid-state image sensor 21 at a constant interval. The solid-state image sensor 21 performs a transfer of charge etc according to the synchronizing signal VD. Then the image of the solid-state image sensor 21 in the live view mode is displayed on the display unit 30. Further, the image displayed on the display unit 30 is updated continually because the synchronizing signal VD is input at the constant interval. In this example, the image in the live view mode has its white balance adjusted with the setting of a last shooting. That is, the setting of the RGB gain setting unit 13 remains as is since the last shooting Exposure time of shooting for each synchronizing signal VD varies depending on a specified exposure value.

At this time, an image is shot by pressing the shooting button. Then image data before pressing the shooting button is used as a white balance evaluation data. That is, at a timing of pressing the shooting button, the image data before the timing is stored to the image processing apparatus 10. Therefore, the process is performed on the image data obtained at the synchronizing signal VD before the timing of pressing the shooting button. In other words, the current brightness explained in the step S103 is obtained according to the image data before the timing of pressing the shooting button. The image at the timing (1), an image is shot with the appropriate exposure value. Then the exposure value for shooting and the exposure value for evaluating saturated brightness region are calculated according to the current brightness. Therefore, the exposure value for shooting and the exposure value for evaluating saturated brightness region are calculated during the exposure time by the synchronizing signal VD at a timing of shooting as indicated with (1) in FIG. 7, and the values are set to the A/D converter 22 and the TG 23.

A synchronizing signal after the timing of pressing the shooting button, which is a timing (2) shown in FIG. 7, an image is shot with the exposure value for evaluating saturated brightness region specified at the timing (1). An exposure time at (2) is adjusted for shooting the exposure image for evaluating saturated brightness region. Accordingly the exposure image for evaluating saturated brightness region is obtained at (2). Further, during the exposure time of (2), a integrated value and an average brightness of the appropriate exposure image are calculated.

At a next timing, which is a timing (3), settings of the A/D converter 22 and the TG 23 are switched so as to shoot with the exposure value for shooting. Specifically, an exposure time in (3) is adjusted to shoot the exposure image for shooting. Further, during the exposure time of (3), the RGB integrated values and the average brightness are calculated for the exposure image for evaluating saturated brightness region. Furthermore at the timing (3), the average brightness for the exposure image for evaluating saturated brightness region is compared with the average brightness for the appropriate exposure image to estimate the light source type of the shooting environment. Therefore at this timing, the RGB gain setting is modified. This enables to display the exposure image for shooting shot at the timing (3) with an appropriate white balance at the next timing. The RGB gain setting is updated when pressing the shooting button in this way. This enables to display the shooting image obtained when pressing the shooting button with white balance appropriately adjusted.

Second Embodiment

In this embodiment, the gain setting for adjusting the white balance is updated at a specified interval. Specifically, the exposure image for evaluating saturated brightness region is obtained by the image pickup apparatus having the exposure value for evaluating saturated brightness region at a constant interval. Then the gain setting is updated continually according to the exposure image for evaluating saturated brightness region. This enables to adjust white balance for an image in live view mode and in moving image of a digital camera. Accordingly, the white balance can be appropriately adjusted for frames of live view image and moving image because the white balance setting can be updated continually. In this example, a process for adjusting white balance of an image in the live view mode is described hereinafter. A basic configuration of the image pickup apparatus of this embodiment is the same as the image pickup apparatus of the first embodiment. Therefore, an explanation is omitted here. An image processing apparatus of this embodiment has similar configuration with the image processing apparatus 10 shown in FIG. 1.

Figure 8:
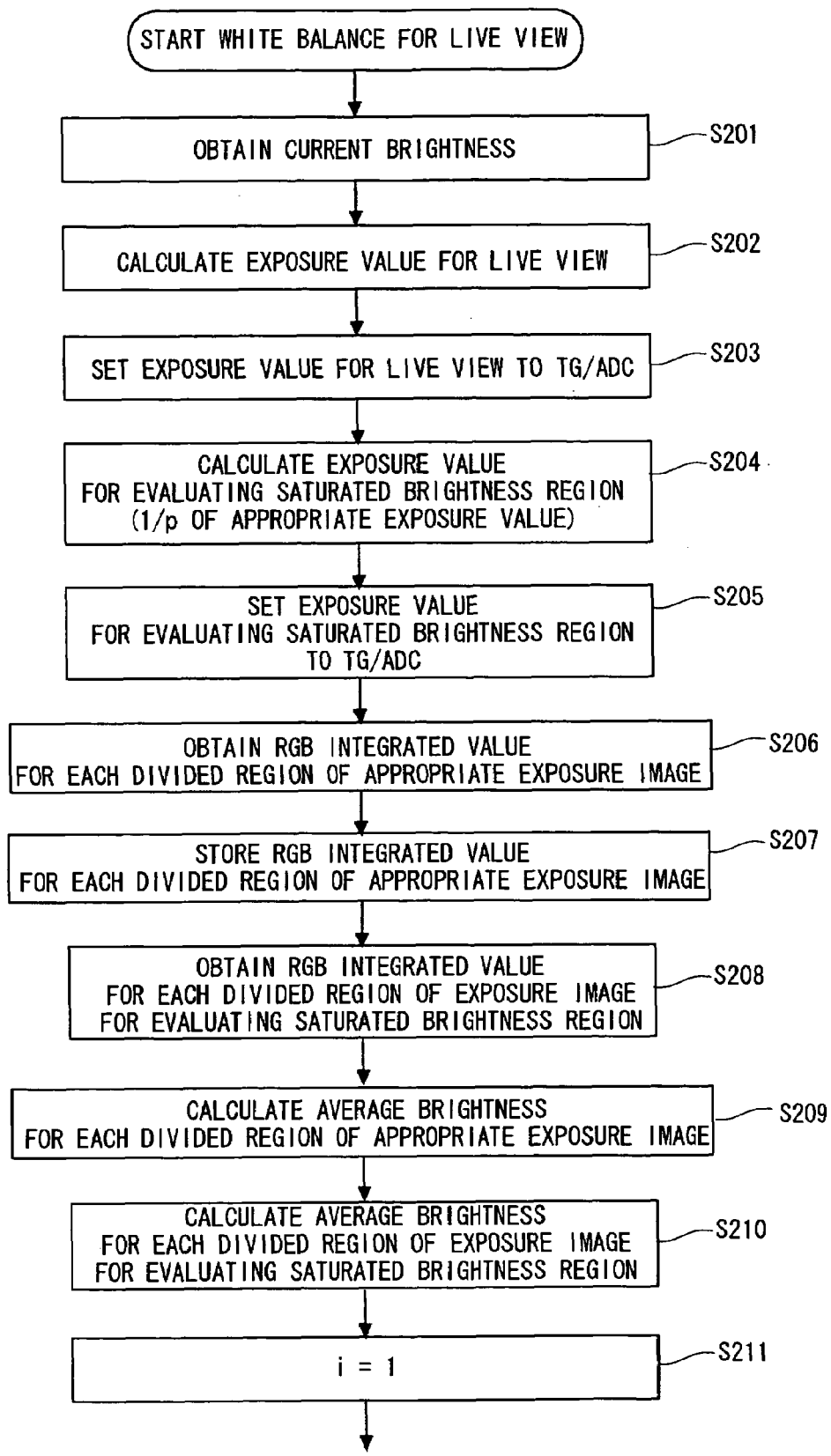
FIG. 8 is a part of a flow chart showing an image processing method according to a second embodiment of the present invention.
Figure 9:
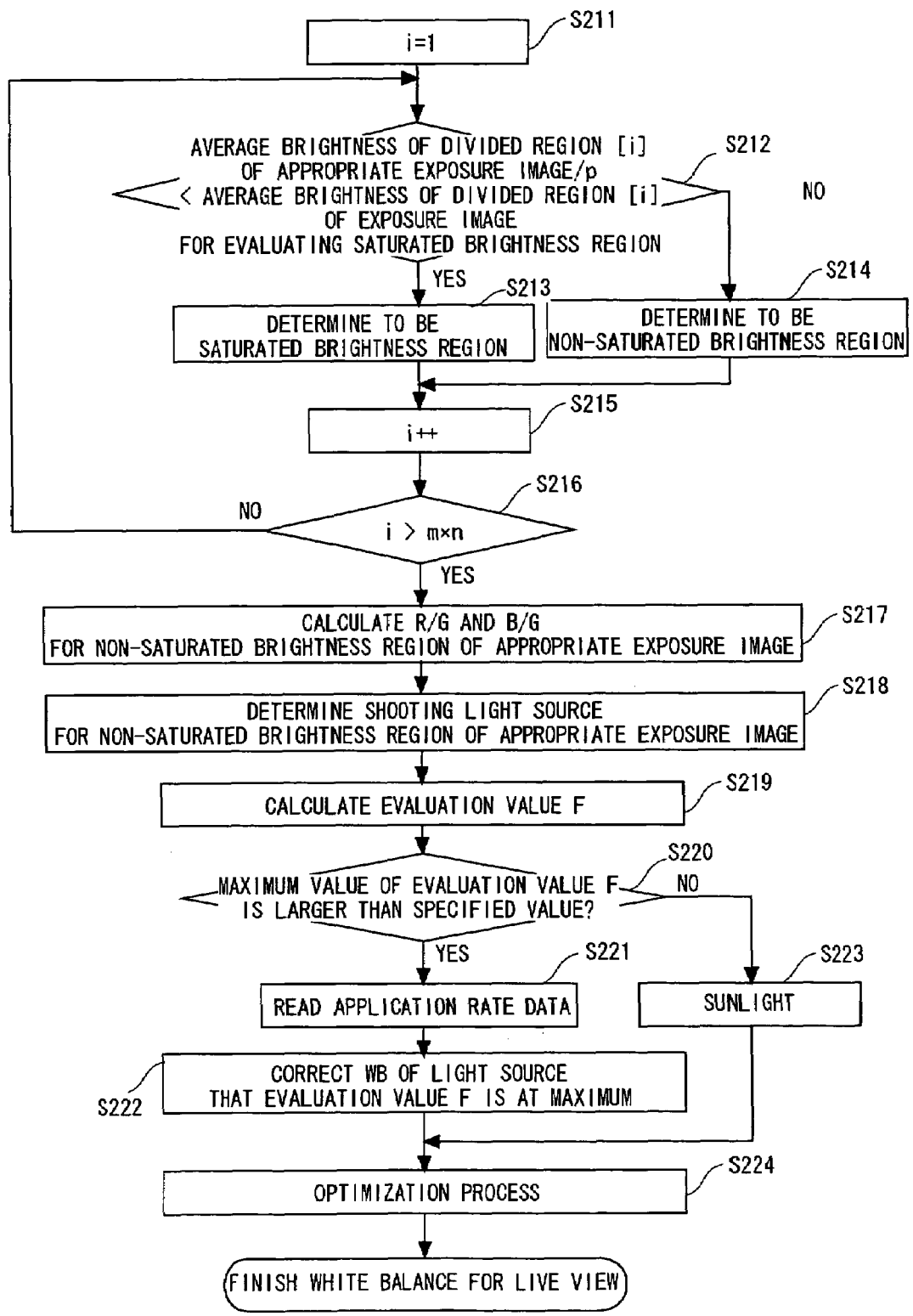
FIG. 9 is a part of a flow chart showing the image processing method according to the second embodiment of the present invention.

In the live view mode, an image shoot by the camera unit 20 is displayed on the display unit 30. The camera unit 20 shoots at a constant interval and outputs a detection signal to the image processing apparatus 10. The image processing apparatus 10 performs a specified image processing in response to the detection signal and outputs a display signal to the display unit 30. Accordingly the image displayed on the display unit 30 is updated at a constant interval. In this embodiment, the setting of the white balance adjustment is updated in the live view mode. Therefore, the white balance setting is updated at a constant interval to display a live view image in the live view mode. An image processing method of this embodiment is described hereinafter in detail with reference to FIGS. 8 and 9 are flow charts showing the image processing method of this embodiment. FIG. 9 is a subsequent flow chart flowing the flow chart of FIG. 8. Processes in each step are similar to the processes of the steps of the first embodiment. Thus detailed explanation is omitted.

In an adjustment of the white balance as shown in FIG. 8, firstly a current brightness is obtained (step S201). In this example, the brightness according to the appropriate exposure image is calculated. The same process as the step S103 of the first embodiment is performed here. Then an exposure value for live view is calculated according to the current brightness (step S202). The same process as the step S104 of the first embodiment is performed here. Then the exposure value for live view is set to the TG 23 and the A/D converter 22 (step S203). The same process as the step S107 of the first embodiment is performed here. Specifically the next image for live view is obtained with the exposure value for live view. Furthermore, in the white balance setting, the exposure image for live view obtained last time is used as the appropriate exposure image.

After that, the exposure value for evaluating saturated brightness region is calculated according to the current brightness (step S204). Specifically, 1/p of the exposure value for the appropriate exposure value is the exposure value for evaluating saturated brightness region. The next image for live view is obtained with this appropriate exposure value. The same process as the step S105 of the first embodiment is performed here. Then the exposure value for evaluating saturated brightness region is set to the TG 23 and the A/D converter 22 (step S205). The same process as the step S106 of the first embodiment is performed here.

RGB integrated values for each divided region of the appropriate exposure value is obtained (step S206), and stored (step S207). The same processes as the step S101 and the step S102 of the first embodiment are performed here. Then RGB integrated values for each divided region of the exposure image for evaluating saturated brightness region are obtained (step S208). The same process as the step S108 of the first embodiment is performed here.

An average brightness for each divided region of the appropriate exposure image is calculated according to the RGB integrated value calculated in the step S206 (step S209). The same process as the step S109 of the first embodiment is performed here. Then the average brightness for each divided region of the exposure image for evaluating saturated brightness region is calculated according to the RGB integrated values calculated in the step S208 (step S210). In this example, the same process as the step S110 in which the same process as the step S109 of the first embodiment is performed.

The same processes as the steps S111 to S124 of the first embodiment are performed to adjust the while balance. Specifically, the average brightness for the appropriate exposure image is compared with the average brightness for the exposure image for evaluating saturated brightness region for the first to m×nth divided regions in order to evaluate saturated brightness region or non-saturated brightness region (steps S211 to S216). Then R/G and B/G are calculated for the non-saturated brightness region of the appropriate exposure region (step S217) to determine a shooting light source (step S218).

The evaluation value F is calculated for the light source type estimated for each non-saturated brightness region (step S219). The white balance is set according to the evaluation value F (steps S220 to S224). The processes same as the first embodiment are described hereinafter. Thus detailed explanation is omitted. The white balance is adjusted in this manner. Further, the gain setting for white balance adjustment is updated at a specified interval. The display unit 30 displays with the latest gain setting. This enables to display a live view image with an appropriate white balance.

Figure 10:
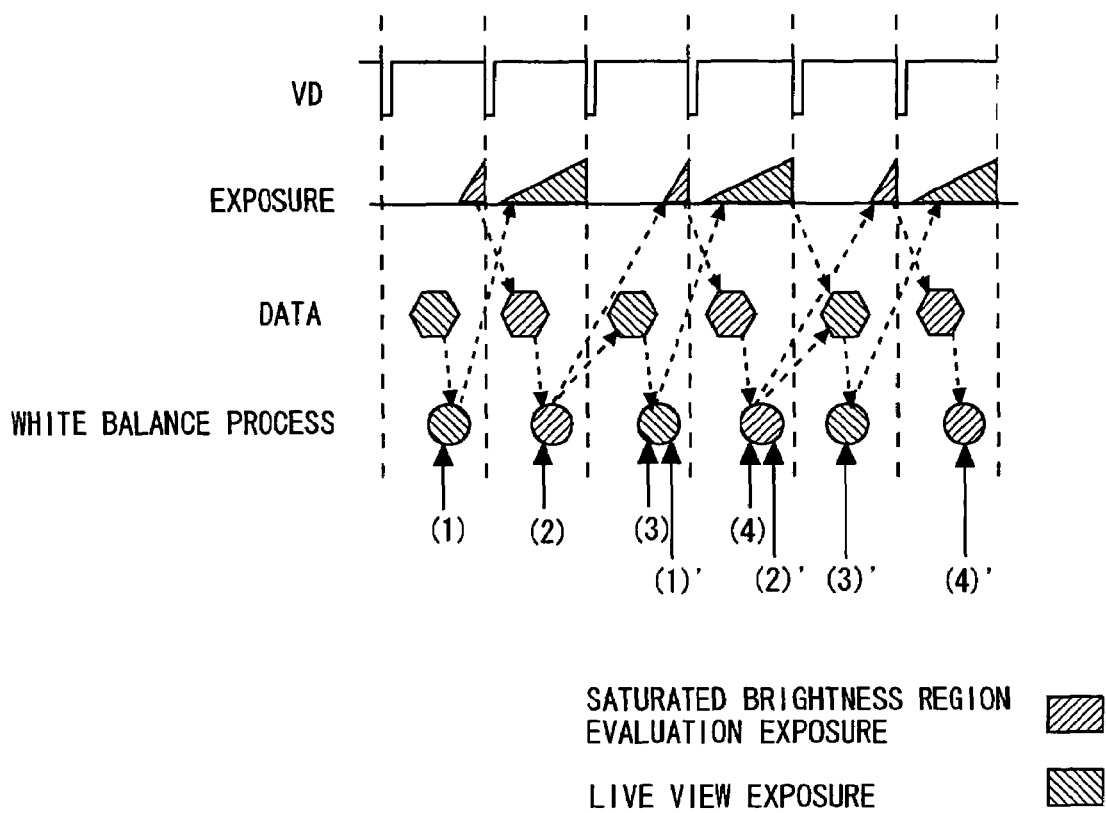
FIG. 10 is a timing chart showing the image processing method according to the second embodiment of the present invention.

A preferred timing for the abovementioned image processing is described hereinafter in detail with reference to FIG. 10. FIG. 10 is a flow chart showing a process for adjusting the white balance by shooting the exposure image for evaluating saturated bright region before shooting an image for live view. In FIG. 10, the white balance setting is change for every frame of the image for live view. To be more specific, live view exposure with an exposure value for live view and exposure for evaluating saturated brightness region is performed alternately. Specifically, after synchronizing with the synchronizing signal VD and performing the live view exposure, synchronize with the next synchronizing signal VD to expose for evaluating saturated brightness region. Repeating this operation enables to alternately obtain the exposure image for live view (appropriate exposure image) and the exposure image for evaluating saturated brightness region. The exposure image for live view (appropriate exposure image) and the exposure image for evaluating saturated brightness region are obtained by synchronizing with the synchronizing signal VD.

Then the image processing shown in FIGS. 8 and 9 are performed according to the image data of the exposure image for live view and the exposure image for evaluating saturated brightness region. In a period indicated with (1) in FIG. 10, the exposure image for evaluating saturated brightness region is shot and a process for data of the exposure image for live view is performed. Further, in a period indicated with (2) in FIG. 10, the exposure image for live view is shot and a process for data of the exposure image for saturated brightness region is performed.

In the abovementioned explanation, the white balance setting is updated by shooting the exposure image for live view and the exposure image for evaluating saturated brightness region alternately. However updating the white balance setting is not limited to this. For example the white balance setting may be updated for every plurality of frames for the exposure image for live view. In this case, the exposure image for evaluating saturated brightness region is obtained after obtaining the exposure image for live view for plurality of times. Accordingly a plurality of frames for the exposure image for live view until obtaining the exposure image for evaluating saturated brightness region will have the same white balance setting. This prevents from lowering frame frequency even in case the white balance of the exposure image for live view is adjusted. Therefore, the image for live view can be displayed quickly.

The image processing method of this embodiment may be combined with the image processing method of the first embodiment. That is, in case of shooting a still image, a shooting button is pressed while displaying the exposure image for live view with its white balance adjusted as with the second embodiment. This changes the timing (2) of FIG. 10 to the timing (1) of FIG. 7, for example. Therefore, an image can be shot and stored while looking at a live view image shot with an appropriate white balance.

Although the configuration in which R, G, and B pixels are provided to the solid-state image sensor 21 is explained in the foregoing, the present invention is not limited to this. The image processing method of the present invention can be applied to data from the solid-state image sensor 21 provided with pixels of a plurality of colors. For example the present invention can be applied to the solid-state image sensor 21 having complementary filters such as C (Cyan), M (Magenta), and Y (Yellow). Furthermore the present invention can be applied to 3CCD system in which CCD is provided for each of R, G, and B, and to a CMOS sensor.

It is apparent that the present invention is not limited to the above embodiment and it may be modified and changed without departing from the scope and spirit of the invention.

What is claimed is:

1. An image processing method for controlling white balance of image data obtained by an image pickup apparatus according to image data of the image shot by the image pickup apparatus having pixels of a plurality of colors, the image processing method comprising:

shooting an image as a first exposure value by the image pickup apparatus;

calculating a brightness of the first exposure value for each of divided regions that the image pickup apparatus shot and divided an image into a plurality of regions according to image data by the first exposure value;

shooting an image as a second exposure value different from the first exposure value by the image pickup apparatus;

calculating a brightness for the second exposure value for each of the divided regions according to image data by the second exposure value;

evaluating saturated brightness region that brightness is saturated among the divided regions according to the brightness for the first exposure value and the brightness for the second exposure value; and controlling white balance according to image data of non-saturated brightness region excluding the saturated brightness region among the divided regions.

2. The image processing method according to claim 1, further comprising:

shooting an image as the second exposure value at a specified time interval; and updating a setting for controlling the white balance at a specified cycle.

3. The image processing method according to claim 1, further comprising:

controlling white balance according to the image data by the first exposure value in the non-saturated brightness region, wherein the first exposure value is larger than the second exposure value.

4. The image processing method according to claim 2, further comprising:

controlling white balance according to the image data by the first exposure value in the non-saturated brightness region, wherein the first exposure value is larger than the second exposure value.

5. An image processing apparatus for controlling white balance of image data obtained by an image pickup apparatus according to image data of the image shot by the image pickup apparatus having pixels of a plurality of colors, the image processing apparatus comprising:

an image data storing unit storing the image data of the image shot by the image pickup apparatus;

a integrated value calculator calculating integrated value of each color for each of divided regions that the image is divided into a plurality of regions according to the image data;

a brightness calculator calculating a brightness for each of the divided regions according to the integrated value calculated by the integrated value calculator;

a saturated brightness region evaluation unit evaluating a saturated brightness region that brightness is saturated among the divided regions according to a brightness for a first exposure value calculated by the brightness calculator in case of shooting as a first exposure value and a brightness for a second exposure value calculated by the brightness calculator in case of shooting as a second exposure value; and a white balance controlling unit for controlling white balance according to image data of non-saturated brightness region excluding the saturated brightness region among the divided regions.

6. The image processing apparatus according to claim 5, wherein the image processing apparatus shoots an image as the second exposure value at a specified time interval; and updates a setting for controlling the white balance at a specified cycle.

7. The image processing apparatus according to claim 5, further comprising a gain setting unit including gains set to each of the plurality of colors, wherein the white balance controlling unit controls the white balance by changing the gains in the gain setting unit.

8. The image processing apparatus according to claim 6, further comprising a gain setting unit including gains set to each of the plurality of colors, wherein the white balance controlling unit controls the white balance by changing the gains in the gain setting unit.

9. An image pickup apparatus having pixels of a plurality of colors comprising:

the image processing apparatus according to claim 5.

10. An image pickup apparatus having pixels of a plurality of colors comprising:

the image processing apparatus according to claim 6.

11. An image pickup apparatus having pixels of a plurality of colors comprising:

the image processing apparatus according to claim 7.

12. An image pickup apparatus having pixels of a plurality of colors comprising:

the image processing apparatus according to claim 8.

* * * * *